(12) United States Patent
Hancock (10) Patent No.: US 9,936,713 B2
(45) Date of Patent: Apr. 10, 2018

(54) SYSTEM FOR SMOKING FOOD (71) Applicant: Cargill, Incorporated, Wayzata, MN (US)

(72) Inventor: Philip L. Hancock, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 286 days.

(21) Appl. No.: 14/653,430

(22) PCT Filed: Dec. 20, 2013

(86) PCT No.: PCT/US2013/076897
§ 371 (c)(1),
(2) Date: Jun. 18, 2015

(87) PCT Pub. No.: WO2014/100574
PCT Pub. Date: Jun. 26, 2014

(65) Prior Publication Data
US 2015/0313248 A1 Nov. 5, 2015

Related U.S. Application Data (60) Provisional application No. 61/745,127, filed on Dec. 21, 2012.

(51) Int. Cl.
*A23L 27/27* (2016.01)
*A23B 4/052* (2006.01)
*A23B 4/044* (2006.01)
*A23L 13/40* (2016.01)

(52) U.S. Cl.
CPC .............. *A23B 4/052* (2013.01); *A23B 4/044* (2013.01); *A23L 13/428* (2016.08); *A23L 27/27* (2016.08)

(58) Field of Classification Search
CPC ........ A23L 27/27; A23L 13/40–13/428; A23L 13/70–13/72
USPC ..................................................... 99/467, 482
See application file for complete search history.

(56) References Cited

U.S. PATENT DOCUMENTS

| | | | | |
|---|---|---|---|---|
| 3,472,151 A * | 10/1969 | Cox | ..................... | A47J 37/0704 99/340 |
| 5,775,315 A * | 7/1998 | Baykal | ................ | A47J 37/0781 126/25 R |
| 5,888,572 A * | 3/1999 | Gics | ......................... | A21D 8/06 426/393 |
| 5,891,498 A * | 4/1999 | Boehler | ................ | A23B 4/052 126/25 R |
| 5,989,610 A * | 11/1999 | Ruzek | ..................... | A23B 4/027 426/281 |
| 2002/0106428 A1* | 8/2002 | Szyjkowski | ........... | A23B 4/052 426/113 |
| 2005/0092191 A1* | 5/2005 | Feinberg | ............. | A47J 37/0786 99/482 |
| 2010/0218691 A1* | 9/2010 | Adams | ................... | A23B 4/044 99/482 |

(Continued)

*Primary Examiner* — Michael LaFlame, Jr.

(57) ABSTRACT

Systems and methods for smoking food are disclosed. In one embodiment, a system for smoking food includes a first container configured for containing an article of food. The system also includes a second container configured for containing a smoking material. The second container is contained within the first container. The second container has a cover and a base, and the cover is selectively removably coupled to the base.

20 Claims, 10 Drawing Sheets

(56) References Cited

U.S. PATENT DOCUMENTS

2013/0213243 A1* 8/2013 Borovicka .......... A47J 37/0786
99/482
2013/0216691 A1* 8/2013 Sudmalis ................ A47J 43/18
426/644

* cited by examiner

SYSTEM FOR SMOKING FOOD

CROSS-REFERENCE TO RELATED APPLICATIONS

This application claims the benefit from International Application No. PCT/US2013/076897, which was filed on Dec. 20, 2013, which in turn claims priority to U.S. Provisional Patent Application, Ser. No. 61/745,127, filed on Dec. 21, 2012, SYSTEM FOR SMOKING FOOD, wherein the entities of said parent applications are incorporated herein by reference.

TECHNICAL FIELD

The present disclosure relates generally to a system and method for smoking food. Aspects of the disclosure are particularly directed to a container for smoking the food, such as protein (e.g., meat).

BACKGROUND

A method of cooking a frozen bird in a bag is known as shown and described in U.S. Patent Application Publication No. US2010/0247720 published Sep. 30, 2010 and filed as application Ser. No. 12/722,273 by Steven D. Leitch et al. and assigned to Jennie-O Turkey Store, LLC.

A ready-to-cook turkey is known, such as the HONEYSUCKLE WHITE SIMPLY DONE whole young turkey, available from Cargill, Incorporated, Wayzata, Minn., USA.

A bag for curing food is known as shown and described in U.S. Pat. No. 5,520,940 titled "Bag for Curing Food" issued May 28, 1996 to Tapani Tirkonen of Kortteinen, Finland.

SUMMARY

Provided is a system for smoking food, the system comprising a first container configured for containing an article of food, and a second container configured for containing a smoking material, where the second container is contained within the first container; and wherein the second container is selectively removable from the first container. In some embodiments, the second container further comprises a cover and a base, where the cover is selectively removably coupled to the base, and where the cover is selectively positionable between a first (opened) position and a second (closed) position.

DETAILED DESCRIPTION

Specific details of several embodiments of the disclosure are described below with reference to a food smoking system.

One aspect of the present disclosure is directed toward a system for smoking food. The system includes a first container configured for containing an article of food. The system also includes a second container configured for containing a smoking material. The second container is contained within the first container.

Figure 1:
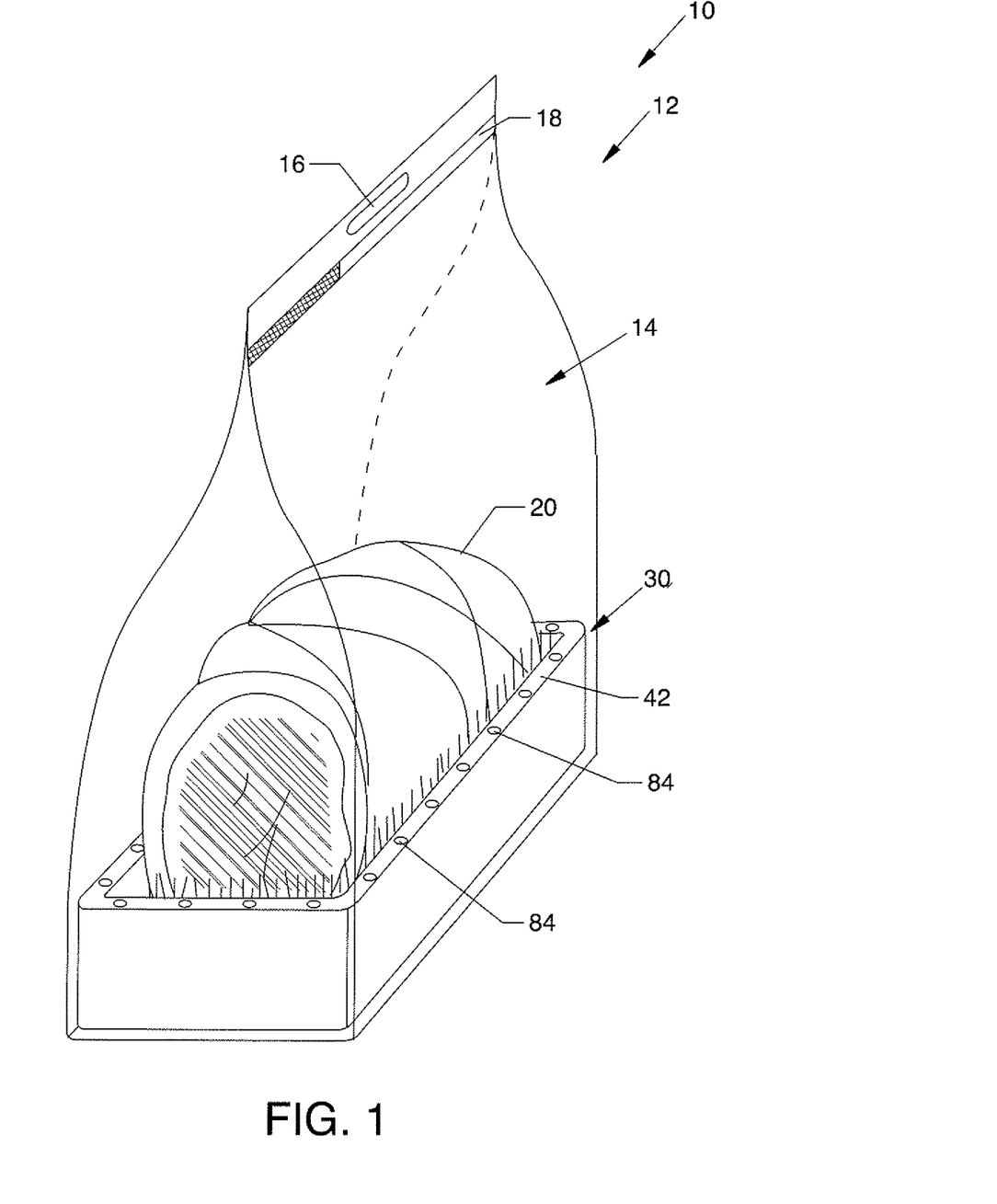
FIG. 1 is a perspective view of a food smoking system according to an exemplary embodiment.
Figure 2:
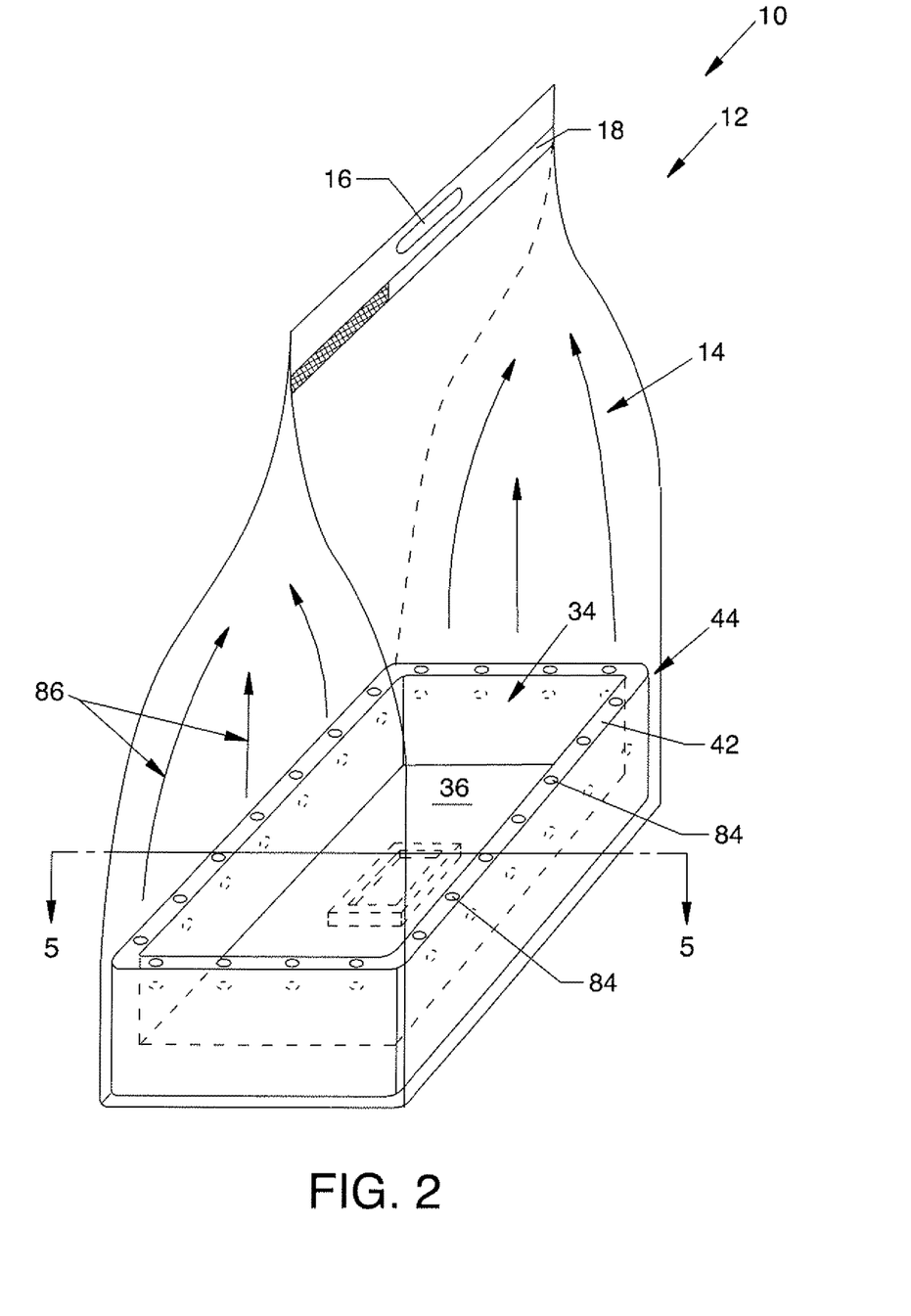
FIG. 2 is perspective view of the food smoking system of FIG. 1 showing an insert according to an exemplary embodiment.
Figure 3:
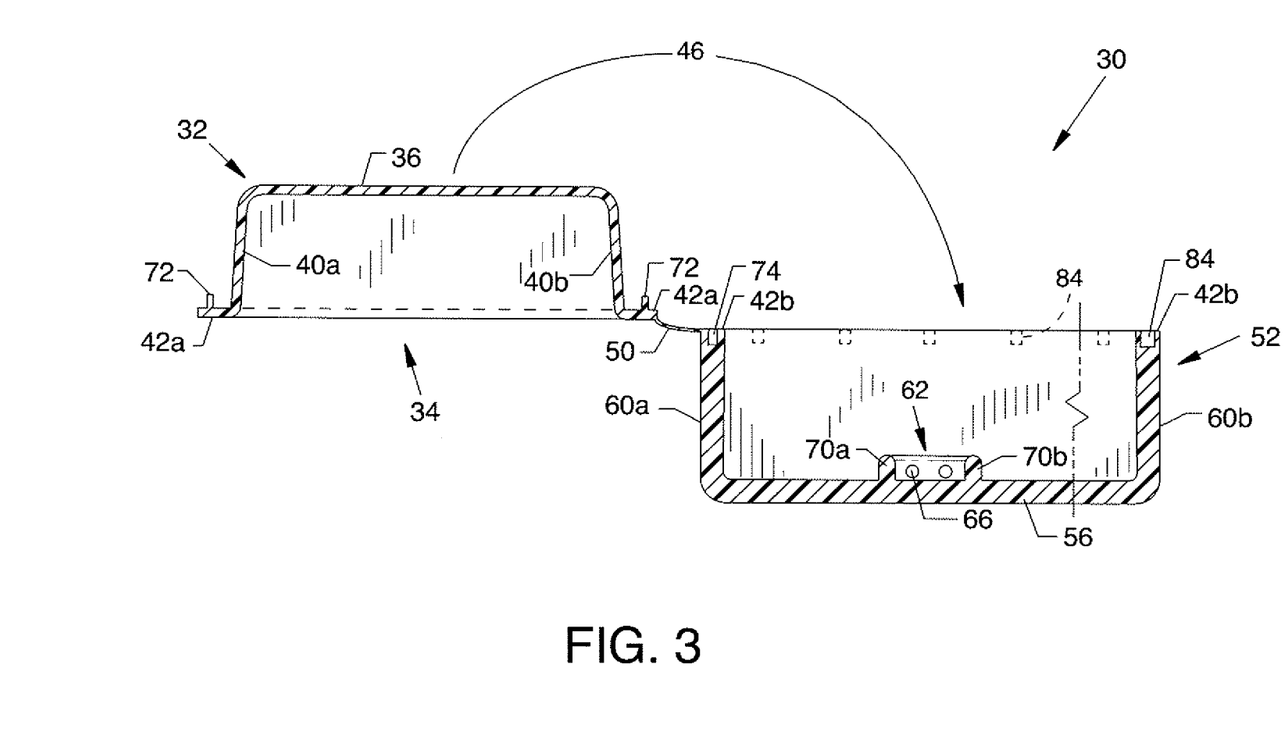
FIG. 3 is an end elevation view of the insert of FIG. 2.

Referring to FIG. 1, a food smoking system 10 is shown according to an exemplary embodiment. Food smoking system 10 includes a first container (shown as a bag 12) having a space (shown as an interior smoking chamber 14). A second container (shown as an internal container or insert 30) is shown inside of interior smoking chamber 14 of bag 12. Insert 30 includes a lid or top (shown as a cover 32) and a bottom or base 52 (see FIG. 3). Cover 32 is selectively positionable between a closed position 44 (see FIGS. 2, 5, and 6) and an opened position 46 (see FIGS. 3 and 4) relative to base 52. As shown in FIG. 3, cover 32 is configured to pivot about a fastener (shown as a living hinge 50) between opened position 46 and closed position 44 (see FIGS. 2, 5, and 6). An article of food (shown as a protein or meat block 20) rests on insert 30 when cover 32 is in closed position 44 (see FIGS. 2, 5, and 6).

Referring further to FIG. 1, bag 12 is shown having a handle 16 for transporting meat block 20 (e.g., carrying from the retail display case to the consumer's home). The handle 16 may be integrated into the bag 12 (e.g., cut out) according to one example, and may be attached to the bag 12 (e.g., glued) according to another example. Bag 12 is shown in FIG. 1 having an interlocking seal 18.

Referring to FIG. 3, cover 32 is shown in opened position 46. Cover 32 includes a tray 34 for supporting, retaining or holding meat block 20. Meat block 20 is shown in FIG. 1 resting on a horizontal surface 36 of tray 34.

Figure 4:
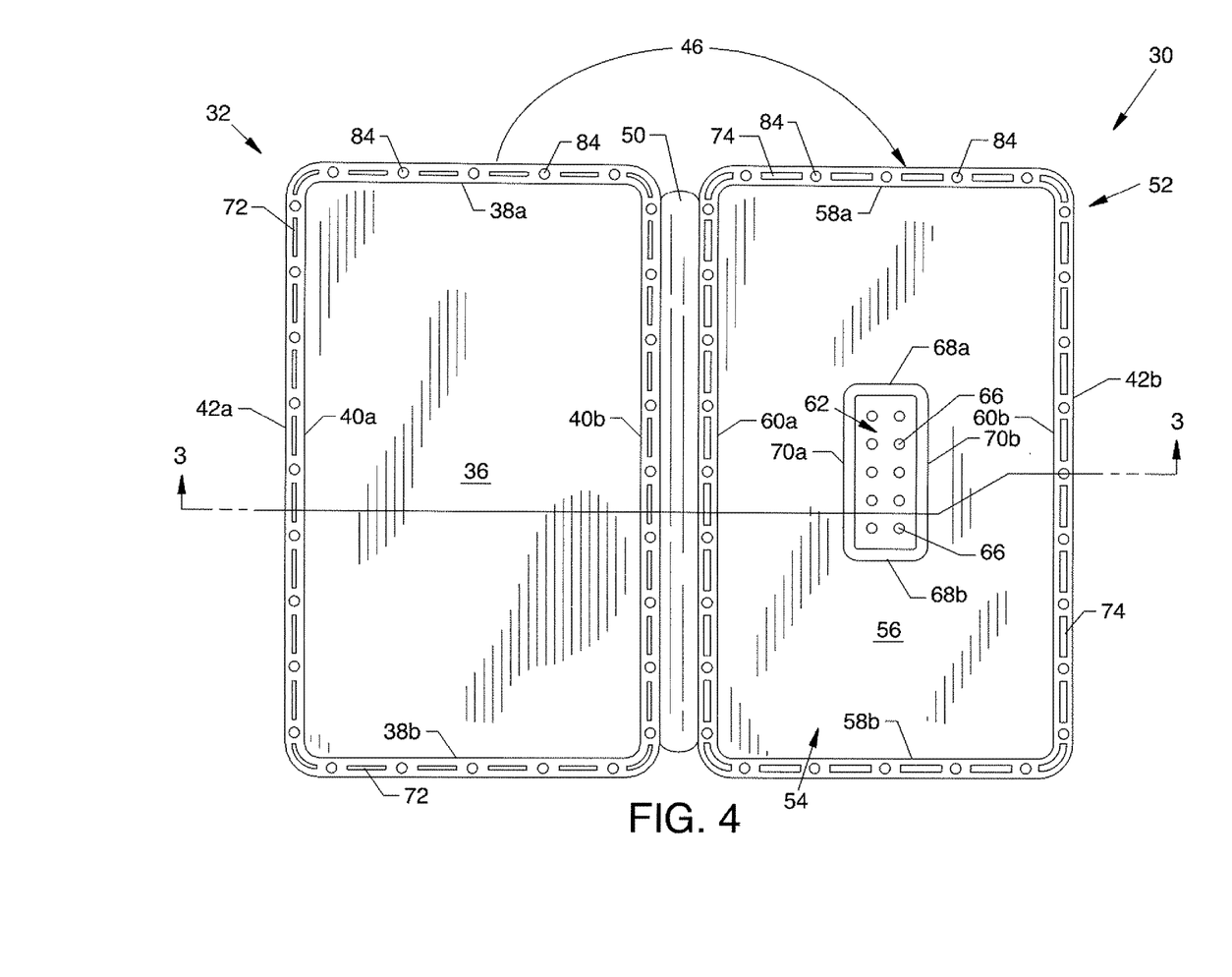
FIG. 4 is a top plan view of the insert of FIG. 2.

Referring to FIG. 4, horizontal surface 36 of tray 34 is surrounded by vertical end walls 38a and 38b and vertical side walls 40a and 40b. A flange or lip 42a and 42b (shown as a tab 42 in FIG. 1) extends horizontally from each of vertical end walls 38a and 38b and vertical side walls 40a and 40b.

Referring further to FIG. 4, base 52 of insert 30 includes a cavity (shown as a smoke generation chamber 54). Smoke generation chamber 54 includes a horizontal surface (shown as a floor 56). Rising from floor 56 are vertical end walls 58a and 58b and vertical side walls 60a and 60b. A flange or lip 42b extends horizontally from each of vertical end walls 58a and 58b and vertical side walls 60a and 60b. A cavity (shown as a chamber 62) for retaining a smoking material 66 is formed in a rectangular shape by vertical end walls 68a and 68b and vertical side walls 70a and 70b extending from floor 56. The chamber for retaining the smoking material may be any shape (e.g., rectangular, circular) according to alternative embodiments. In FIG. 4, chamber 62 is shown positioned in the center of floor 56, and may be positioned in different locations (e.g., corner, corners, end, side) according to alternative embodiments.

Figure 5:
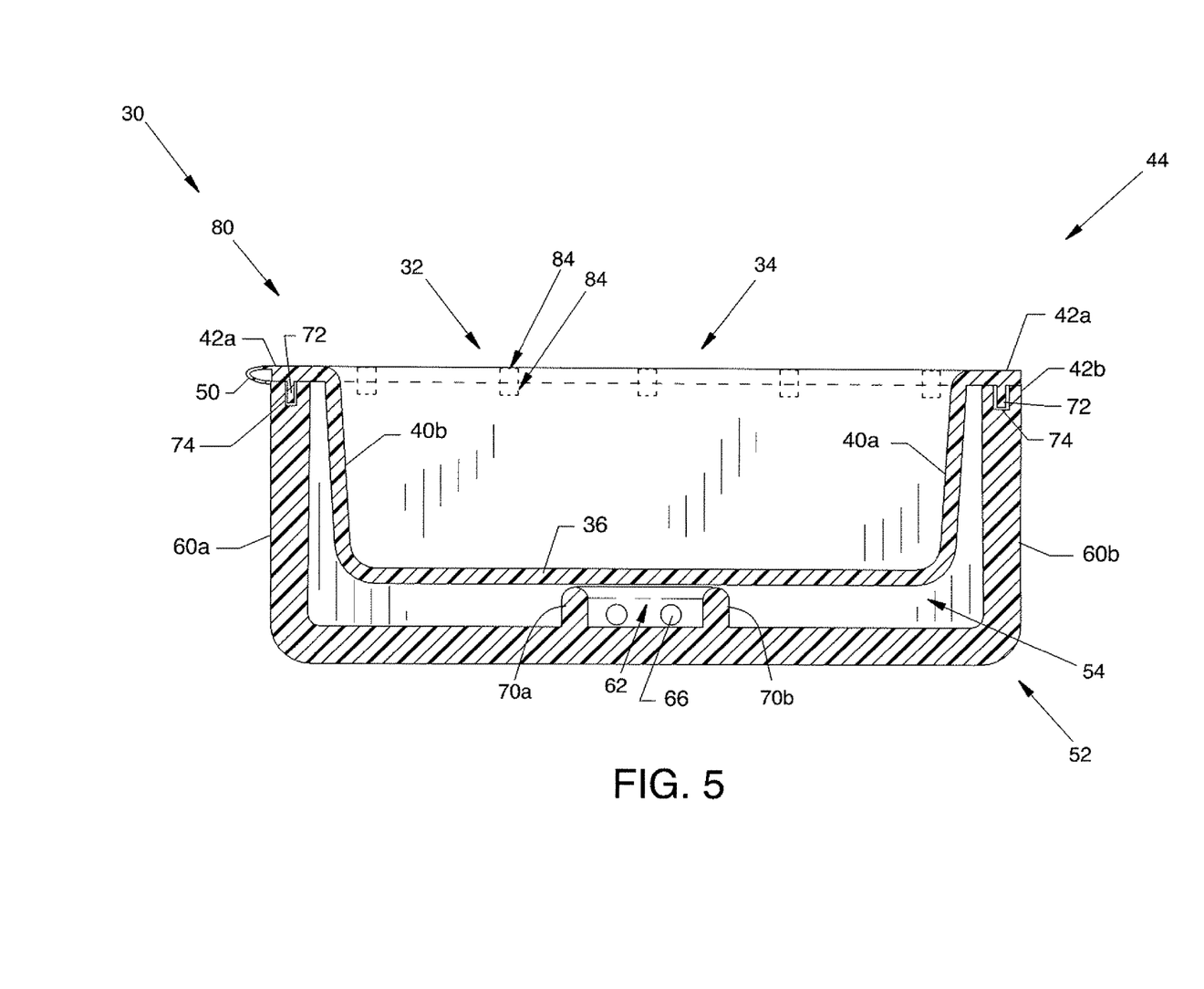
FIG. 5 is a cross sectional view showing a locking mechanism of the insert of FIG. 2 along line 5-5 of FIG. 2.

Referring to FIG. 5, cover 32 of insert 30 is attached to base 52 of insert 30 by a locking mechanism 80 when cover 32 is in closed position 44 (i.e., the insert is in the closed configuration). As shown in FIG. 5, locking mechanism 80 has a tongue and groove configuration. Tab 42a of cover 32 has a rail or tongue 72, and tab 42b of base has a channel or groove 74. Locking mechanism 80 is closed or engaged when tab 42a of cover 32 interlocks via a friction fit with tab 42b of base 52. According to one example, the friction fit is strong enough so that it is not broken or overcome by the weight of the meat block resting on the tray. Referring further to FIG. 5, when cover 32 is in closed position 44, horizontal surface 36 of tray 34 rests on vertical end walls 68a and 68b and vertical side walls 70a and 70b of chamber 62, thus enclosing chamber 62 and smoking material 66.

Figure 6:
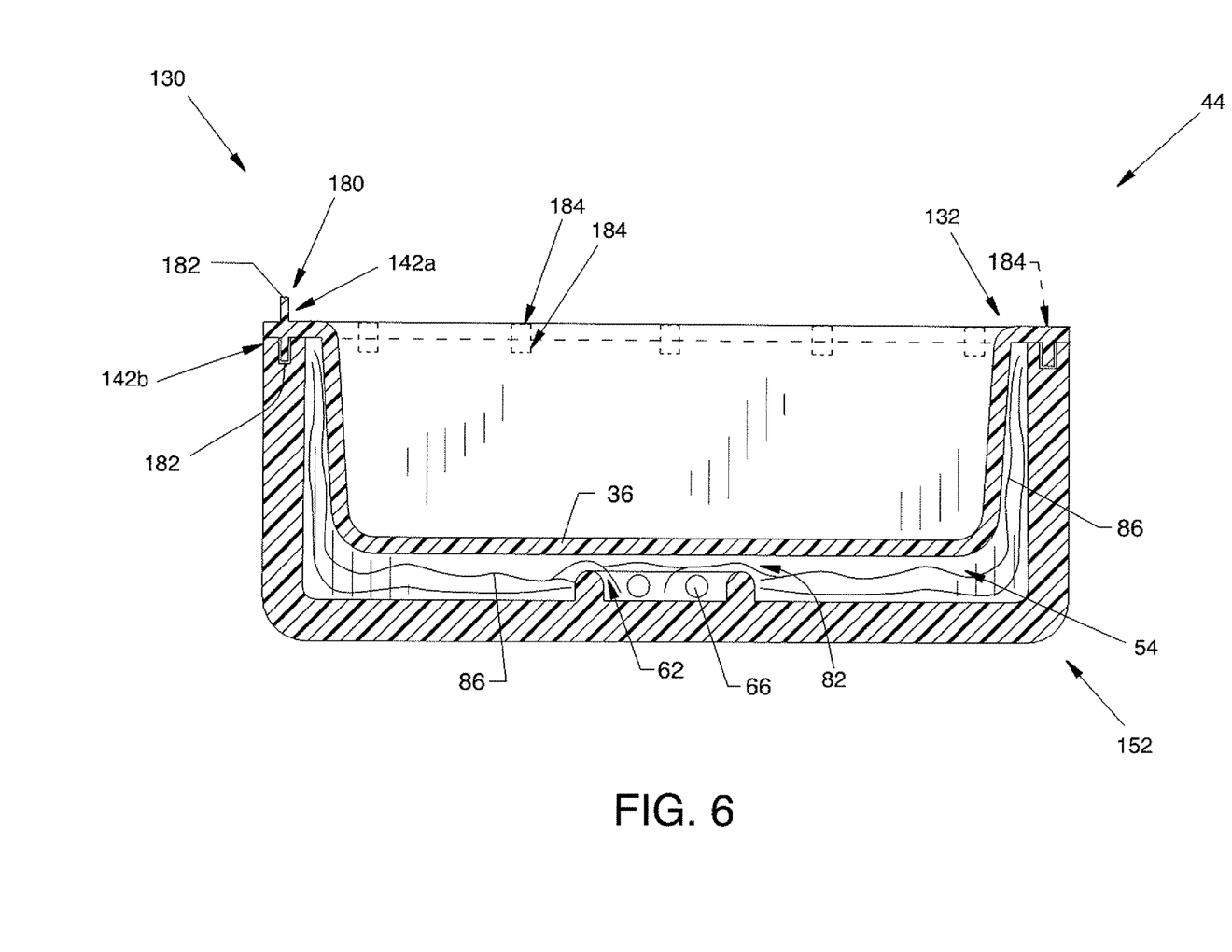
FIG. 6 is a cross sectional view of an insert having a locking mechanism according to an alternative embodiment.

According to an alternative embodiment as shown in FIG. 6, there may be a small space 82 (e.g., for gas or smoke circulation) between the cover 32 and the chamber 62 for retaining the smoking material 66. According to one example, the small space may be 1 mm. According to another example, the small space may be 1 mm-2 mm. According to another example, the small space may be 1 mm-3 mm. According to another example, the small space may be 1 mm-4 mm. According to another example, the small space may be 1 mm-5 mm. Smoke 86 generated from smoking material 66 may be conveyed (e.g., in gas or air) from cavity 62 to smoke generation chamber 54 through space 82 (see FIG. 6), and from smoke generation chamber 54 to smoking chamber 14 of bag 12 through apertures 84 of insert 30 (see FIG. 2). As shown in FIG. 1, vent ports shown as apertures 84 are circular in shape. According to other examples, the holes may have any shape (e.g., lines, slits, rectangular, square, oval, irregular).

Referring to FIG. 6, an insert 130 is shown having a locking mechanism 180 according to an alternative embodiment. Like insert 30 of FIG. 2, insert 130 includes a cover 132 nested at least partially within and a base 152. Cover 132 includes a horizontal tab 142a and base 152 includes a horizontal tab 142b. When insert 130 is in closed position 44, tab 142a aligns over tab 142b. A fastener (shown as a hollow elongate member or pin 182) attaches horizontal tab 142a of cover 132 to horizontal tab 142b of base 152. Pin 182 may include an aperture (shown as a vent 184) for conveyance of smoke 86 from smoke generation chamber 54 to smoking chamber 14 of bag 12. A variety of other locking mechanisms (e.g., press fit, snap fit, friction fit, fasteners) are examples according to other alternative embodiments.

Figure 7:
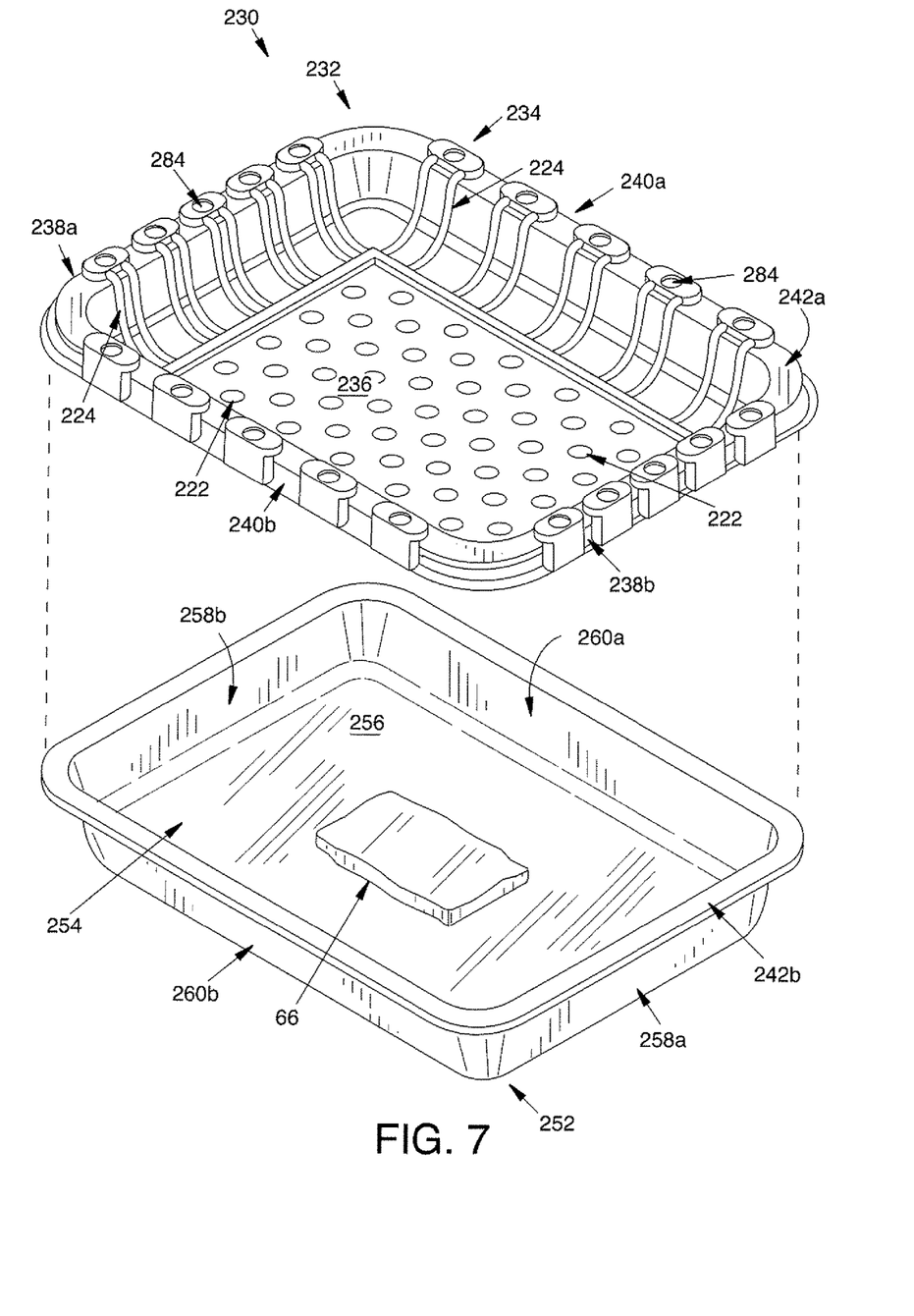
FIG. 7 is an exploded view of an insert of an alternative embodiment.

In another embodiment as shown in FIG. 7, an insert 230 comprises a cover 232 and a base 252. Cover 232 includes a tray 234 for supporting, retaining, or holding meat block 20. Horizontal surface 236 of tray 234 is surrounded by vertical end walls 238a and 238b and vertical side walls 240a and 240b. A flange or lip 242a extends horizontally from each of vertical end walls 238a and 238b and vertical side walls 240a and 240b. Channels 224 on each of vertical end walls 238a and 238b and vertical side walls 240a and 240b extend vertically from horizontal surface 236 to apertures 284. Pegs 222 extend downward from horizontal surface 236 (see FIG. 9). In some examples, the pegs 222 may be hollow.

Referring further to FIG. 7, base 252 includes a cavity (shown as smoke generation chamber 254). Smoke generation chamber 254 includes a horizontal surface (shown as a floor 256). Rising from floor 256 are vertical end walls 258a and 258b and vertical side walls 260a and 260b. A flange or lip 242b extends horizontally from each of vertical end walls 258a and 258b and vertical side walls 260a and 260b. A smoking material 66 is shown positioned in the center of floor 256, and may be positioned in different locations (e.g., corner, corners, end, side) according to alternative embodiments.

Figure 8:
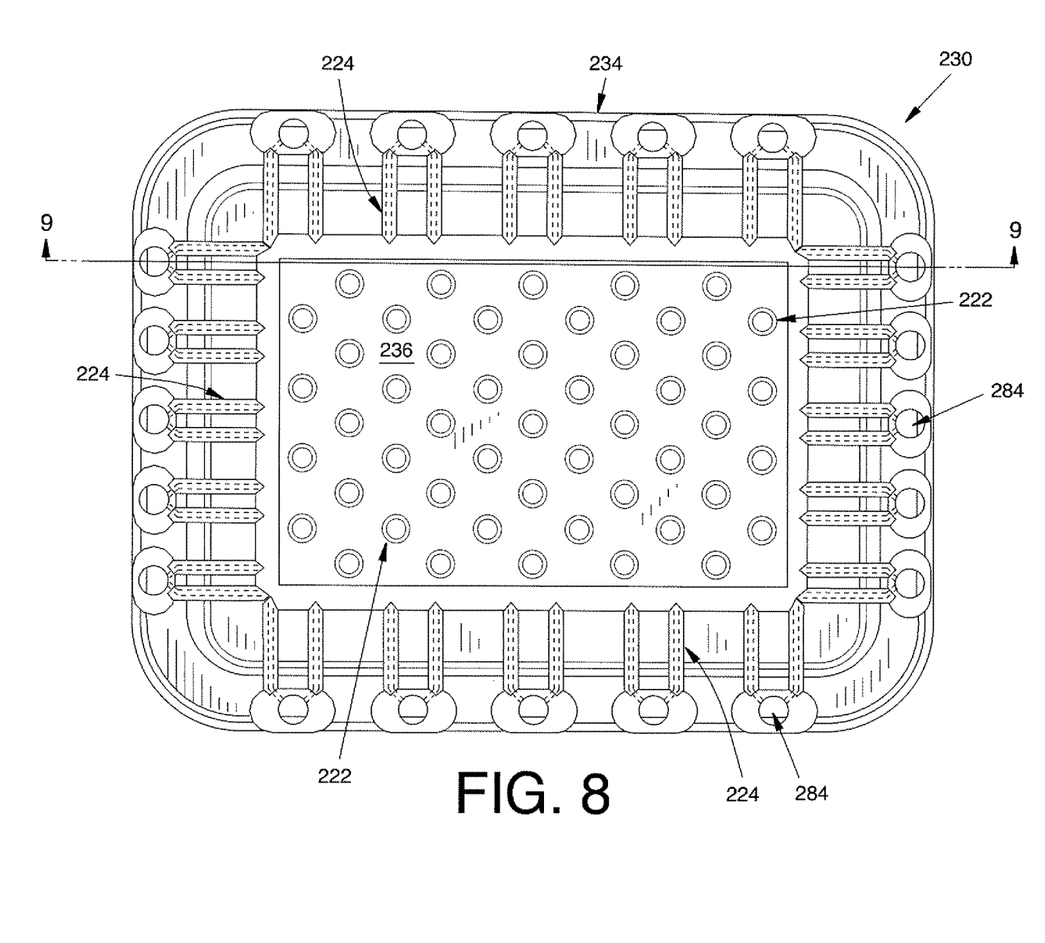
FIG. 8 is a top plan view of the insert of FIG. 7.

Referring to FIG. 8, pegs 222 are shown with a circular base shape. According to other embodiments, the pegs 222 may have a base of another suitable shape (e.g., oval, triangular, square). Horizontal surface 236 is shown including forty-nine pegs 222 positioned as shown. According to alternative embodiments, pegs 222 may be positioned in different configurations. In other examples, horizontal surface 236 includes at least five, at least ten, at least fifteen, at least twenty, at least twenty-five, at least thirty, at least thirty-five, at least forty, or at least forty-five pegs 222. Further referring to FIG. 8, two channels 224 are shown for each aperture 284. In some embodiments, some other number of channels 224 (e.g., one or three) may exist for each aperture 284.

Figure 9:
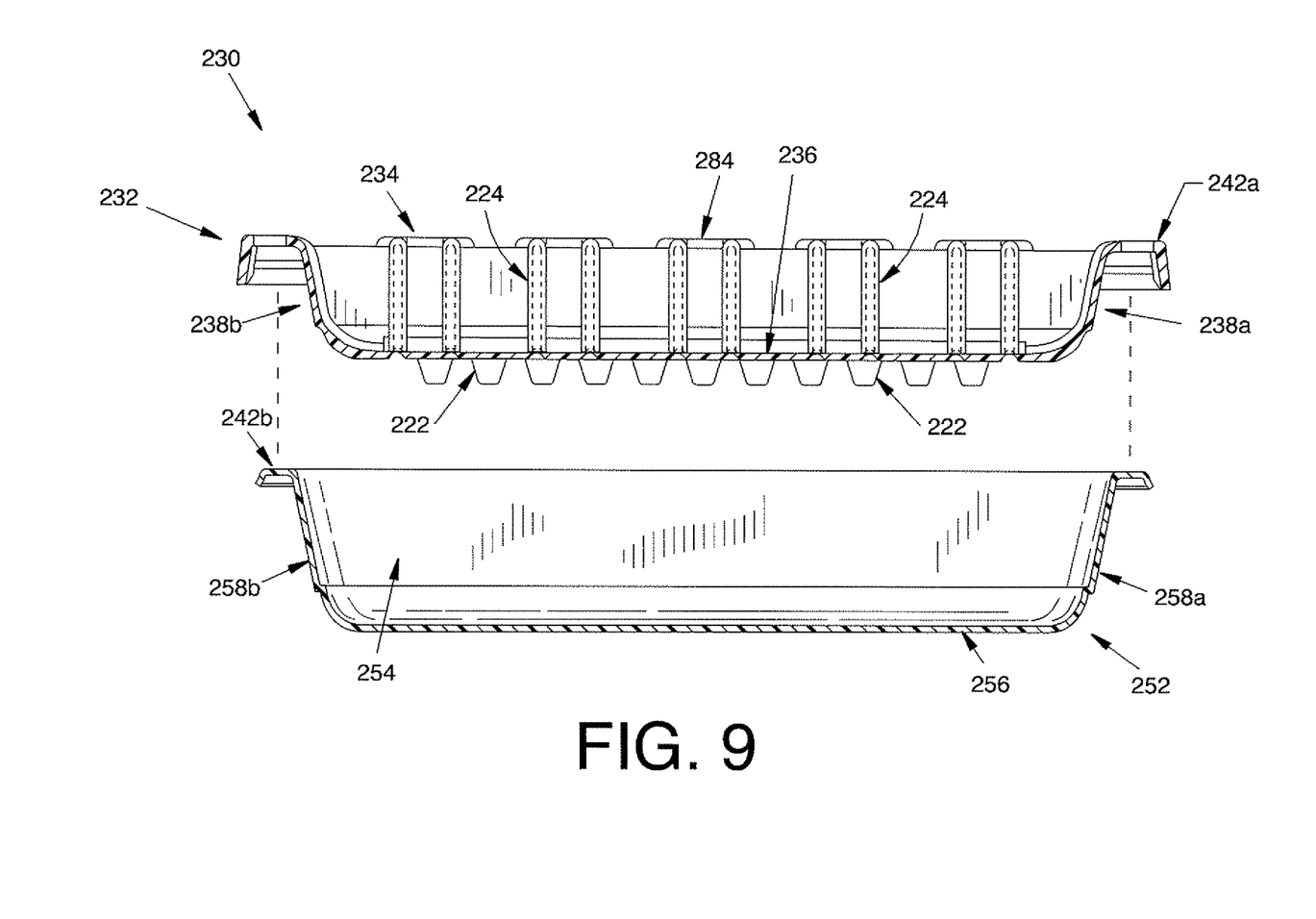
FIG. 9 is an exploded cross sectional view of the insert of FIG. 8 along line 9-9 of FIG. 8.

Referring to FIG. 9, pegs 222 are shown having a frustoconical profile. According to other embodiments, the pegs 222 may have a profile of another suitable shape (e.g., conical, square, rectangular).

Figure 10:
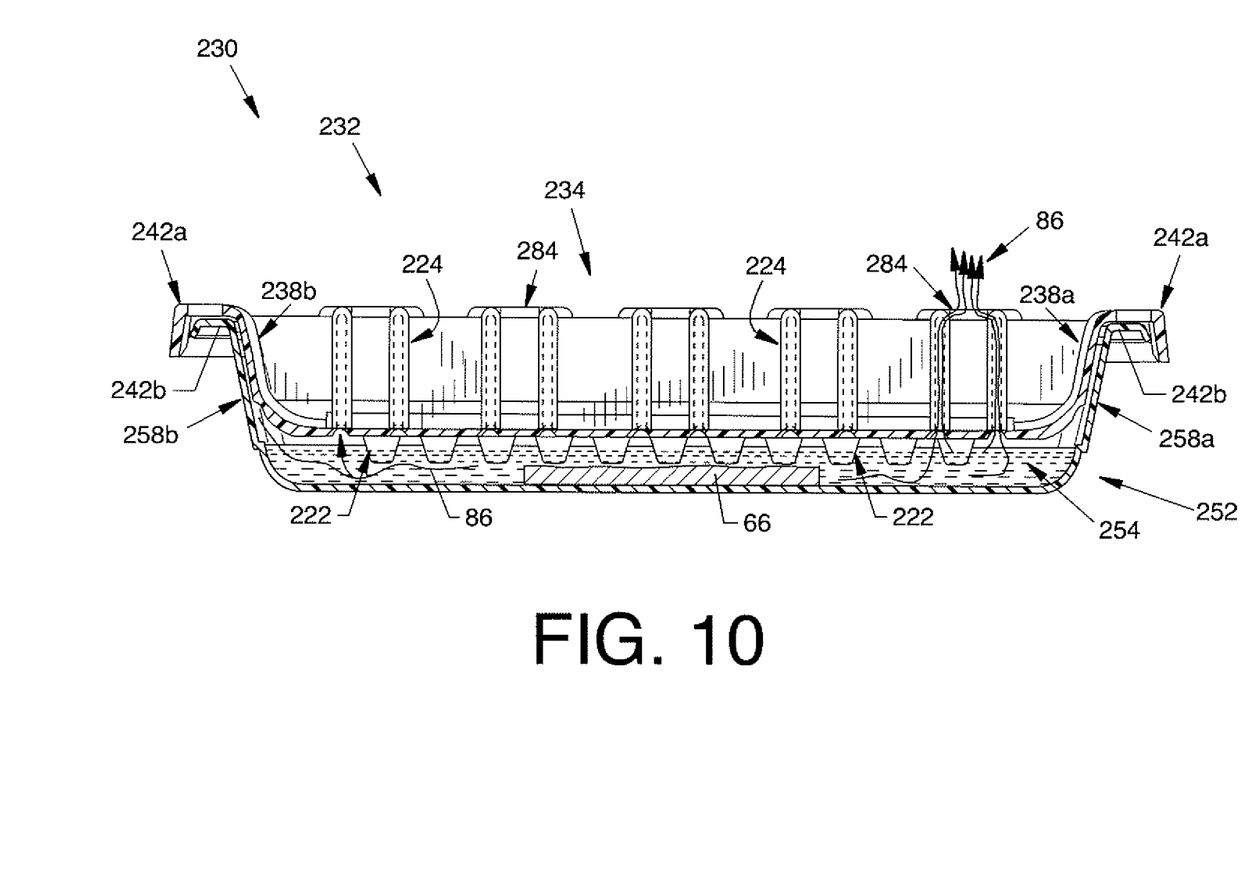
FIG. 10 is a cross sectional view of the insert of FIG. 8 along line 9-9 of FIG. 8 showing smoke traveling from the smoke generation chamber and out of an aperture.

Referring to FIG. 10, pegs 222 may not contact floor 256. In other examples, pegs 222 may contact floor 256. In some embodiments, pegs 222 may contact a smoking material 66 and/or floor 256 when a meat block 20 is positioned on horizontal surface 236 of tray 234 (see FIG. 7).

Referring further to FIG. 10, smoke 86 generated from smoking material 66 may be conveyed (e.g., in gas or air) from smoke generation chamber 254 through channel 224 to smoking chamber 14 of bag 12 through apertures 284 of insert 230. Vent ports shown as apertures 284 in FIGS. 7, 8, and 10 are circular in shape. According to other examples, the holes may be, for example, lines, slits, rectangular, square, oval, or irregular.

According to one example, the bag is a foil bag. According to another example, the bag is a heat resistant bag made of a biaxially oriented polyethylene terephthalate material such as a MYLAR polyester film MYLAR 887 commercially available from Dupont Teijin Films U.S. Limited Partnership. In another example, the bag may be made of an oven-ready film, available, for example, from M&Q Packaging Corporation, Schuylkill Haven, Pa., USA. According to another example, the bag is vacuum packed, hermetically sealed, leak resistant, heavy duty (e.g., 2 mils, 2.5 mils, 3 mils.), suitable for cooking temperatures (e.g., up to 375° F. (190° C.) for up to 4 hours), and oxygen impermeable. In some embodiments, the bag is a modified atmosphere packaging ("MAP") bag. In some embodiments, the MAP bag may comprise a protective atmosphere inside the MAP bag such as, for example, nitrogen gas, carbon dioxide gas, or a mixture thereof. In some embodiments, the ratio of nitrogen gas to carbon dioxide gas in the protective atmosphere is about 70:30 to about 80:20. According to another example, the bag is a CRYOVAC OVEN EASE Bag model numbers HC2X40, HC2X40 Heavy, HC2X70, or HC2X70 commercially available from Sealed Air Corporation of Elmwood Park, N.J., USA. According to one example the bag has a rectangular base and triangular shaped end walls (e.g., a gusset which can expand during the heating process). In some embodiments, the bag may comprise a rectangular base film and a rectangular upper film, where the base film is mated to the upper film using, for example, a horizontal form fill-seal machine available from MULTIVAC Sepp Haggenmüller GmbH & Co. KG, Wolfertschwenden, Germany, to form a bag. In some embodiments, the base film may have a cavity formed therein to receive an insert. According to another example, the bag is printable or printed with merchandising or advertising indicia or other graphics. In some embodiments, the bag may not include a handle.

According to one example, the seal allows one-way removal of air from the bag (e.g., vacuum seal such as by removal of air using a pump). According to another example, the seal provides for self venting when heating, such as the seal used in BEMIS MAGIC STEAM Microwavable Pouches commercially available from the Bemix Company, Inc. of Neenah, Wis., USA.

According to one example, the insert is made of PET/Crystalline Polyethylene Terephthalate ("CPET") material. According to one example, the insert is in the shape of at least one of a square, a rectangle and a parallelogram. According to one example, the insert is a rectangle having a length of about 12 inches (30.48 cm) a width of about 8 inches (20.32 cm) and a height of about 3.5 inches (8.89 cm). According to an alternative embodiment, the insert is not placed within the bag; rather the bag is attached to the insert. According to an alternative embodiment, the insert is selectively reconfigurable between the opened position and the closed position. Such reconfiguration may be useful, for example, in loading, unloading and reloading of the smoking material.

The smoking material may be any material used to create smoke, e.g., from burning or smoldering plant materials such as wood. Suitable wood materials include alder, apple, cedar, cherry, grape, hickory, maple, mesquite, oak, peach, pecan, wine barrel chips, etc. Suitable plant materials include seaweed, lemon peel, orange peel, etc. Suitable herb materials include bay leaves, cinnamon, nutmeg, peppermint, rosemary, tea, etc. Other fuels besides wood, plant and herbs can also be employed, e.g., with the addition of flavoring ingredients. Exemplary flavors include hickory wood, apple wood, campfire, smoked peppercorn and lemon peppercorn (Mediterranean). Smoking material may be in the form of smoking paste, smoking pellets, smoking granules, smoking tablets or pucks, smoking powder, smoking liquid, etc. In one embodiment, the smoking material is in the form of a paste.

The food product may be any type of food. One example is protein. Another example is animal protein or meat. The meat block may be obtained from any animal protein source such as bovine, porcine, equine, caprine, ovine, avian animals, seafood animals, or any animal commonly harvested for food production. Bovine animals include, but are not limited to buffalo, bison, and all cattle, including steers, heifers, cows, and bulls. Porcine animals include, but are not limited to feeder pigs and breeding pigs, including sows, gilts, barrows, and boars. Ovine animals include, but are not limited to, sheep, including ewes, rams, wethers, and lambs, eaprine animals include, but are not limited to, goats, including does, bucks, wethers, and kids. Avian animals include, but are not limited to, birds, including chickens, turkeys, and ostriches (and also include domesticated birds also referred to as poultry). Seafood animals (including from salt water and freshwater sources) include, but are not limited to, fish and shellfish (such as clams, scallops, shrimp, crabs and lobster). According to an alternative example, the meat block may include a pop-up timer to indicate when cooking is complete.

A method of making and using the food smoking system is provided. The method of making the food smoking system includes obtaining the insert and pivoting or providing the insert to the opened configuration. The smoking material is filled in the cavity of the base of the insert. The cover is then pivoted or provided to the closed position, whereby the tray of the cover is touching (or in an alternative embodiment very close to) the smoking material of the cavity so that the smoking material is substantially retained in the cavity. In one embodiment, a bag is then opened, and the insert is then placed inside the bag. The meat block is placed on the insert in the bag. (According to an alternative embodiment, the meat block could be placed on the insert and then the insert and the meat block are simultaneously placed in the bag.) The bag is then sealed. In another embodiment, the insert is placed in the formed cavity of a base film. The meat block is placed on the insert in the base film cavity. (According to an alternative embodiment, the meat block could be placed on the insert and then the insert and the meat block are simultaneously placed in the base film cavity.) The base film is mated to an upper film (e.g., by a heated seal plate) to form a bag.

The bag and meat block may be refrigerated or frozen. In some embodiments, the bag and meat block may be placed inside a carton. In some embodiments the carton may be sealed (e.g., glued, stapled). The carton may facilitate transportation to and/or storage of the bag and meat block in a retail environment. In some embodiments, the carton may comprise a paper material, a plastic material, a cardboard material, or a combination thereof. In some embodiments, the carton may include a handle. In some embodiments, the carton is printable or printed with merchandising or advertising indicia or other graphics.

The bag is provided to the retail environment (e.g., meat display case). A consumer may lift the bag, using the bag handle in some embodiments or the carton or carton handle in other embodiments, and transport the bag to the place where the meat block will be cooked. The bag with the meat block (in the frozen or fresh state) is placed in or on the cooking apparatus (e.g., oven, microwave, grill, open fire). (According to an alternative embodiment, the meat block is thawed before cooking or placing the bag in the oven.) If the bag is provided in a carton, the bag is removed from the carton before cooking. The bag (with the meat block) are heated in an environment having a temperature of from about 300° F. (about 149° C.) to about 400° F. (about 204° C.) for from about fifteen minutes to about four hours (e.g., up to about 375° F. (190° Celsius) for up to about 4 hours). During heating, the smoking material begins to create smoke (e.g., small solid particles or liquid droplets) in the cavity. The smoke is provided from the cavity to the smoke generation chamber. The smoke is then further provided through the vents of the insert to the smoking chamber in the interior of the bag. The smoke physically interacts with the meat block in the smoking chamber of the bag (i.e., smoking the meat block so the meat block absorbs the smoke rather than the bag absorbing the smoke—and thereby infusing the meat block with a smoky or smoke flavor). During the heating process, pressure builds inside the bag until it vents through the seal to the atmosphere.

After the heating (e.g., cooking and smoking) process is completed, the bag is opened. A cooked meat block that is tender and juicy (and the insert) is removed from the bag. Any juices from the meat block resulting from the heating process may be retained by the tray of the insert (e.g., used for basting or marinating the meat block, used for gravy, au jus, discarded). (According to an alternative embodiment, the meat block may be removed from the bag and the insert retained in the bag.) The bag and the insert may then be discarded. (According to an alternative embodiment, the bag and/or the insert may be recycled for future reloading with smoking material and meat block and reused.) According to other alternative embodiments, any of these steps may be eliminated, repeated, or conducted in other sequences.

One advantage of the food smoking system is the meat block (e.g., ½ bone-in-breast turkey) could be prepared with overall shortened preparation time (e.g., cook from frozen) without the need for braising or adding smoke flavorings—which is convenient, quick, easy to prepare and clean up, and which results in an end product that is tasty and moist.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. When the claims use the word "or" in reference to a list of two or more items, that word covers all of the following interpretations of the word: any of the items in the list, all of the items in the list, and any combination of the items in the list.

The above detailed descriptions of embodiments of the invention are not intended to be exhaustive or to limit the invention to the precise form disclosed above. Although specific embodiments of and examples for, the invention are described above for illustrative purposes, various equivalent modifications are possible within the scope of the invention, as those skilled in the relevant art will recognize. For example, while steps are presented in a given order, alternative embodiments may perform steps in a different order. The various embodiments described herein can also be combined to provide further embodiments.

In general, the terms used in the following claims should not be construed to limit the invention to the specific embodiments disclosed in the specification, unless the above detailed description explicitly defines such terms. While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim:

1. A system for smoking food, comprising:
   a first container having a receiving volume capable of containing an article of food; and
   a second container having a receiving volume capable of containing a smoking material, the second container being contained within and selectively removable from the first container;
   the second container comprising a cover selectively removably coupled to a base so that the cover is selectively positionable between a first (opened) position and a second (closed) position;
   the cover comprising a first horizontal surface configured for supporting the article of food when the cover is closed;
   the cover and the base together defining a chamber when the cover is in the closed position; and
   the base comprising a second horizontal surface configured for supporting the smoking material;
wherein the cover comprises at least one vent, the vents of the system being above the first horizontal surface providing gas communication of smoke from the chamber to the first container.

2. The system of claim 1, wherein the second container further comprises a vent configured for gas communication from the second container to the atmosphere.

3. The system of claim 1, wherein the second container is formed in an rectangular shape.

4. The system of claim 1, wherein the second container further comprises a living hinge for selectively pivoting the cover between the first (opened) position and the second (closed) position and further for attaching the cover to the base when the cover is in the closed position.

5. The system of claim 1, wherein the cover nests at least partially within the base when the cover is in the closed position.

6. The system of claim 1, wherein the cover is removably coupled by a friction fit to the base when the cover is in the closed position.

7. The system of claim 1, wherein the cover further comprises a peg that contacts the second horizontal surface when food is positioned on the first horizontal surface.

8. The system of claim 7, wherein the peg is hollow.

9. The system of claim 1, wherein the cover comprises vertical end walls and side walls surrounding the first horizontal surface, and channels on the vertical end walls and side walls extend vertically to apertures for gas communication of smoke from the chamber to the first container.

10. The system of claim 1, wherein the second container further comprises a smoking material in the chamber.

11. The system of claim 1, further comprising an article of food in the first container and supported on the first horizontal surface.

12. The system of claim 11, wherein the article of food further comprises meat.

13. The system of claim 1, wherein the first container is formed from a biaxially-oriented polyethylene terephthalate material.

14. The system of claim 1, wherein the second container is formed from a Crystalline Polyethylene Terephthalate (CPET) material.

15. The system of claim 1, comprising an article of food in the first container and supported on the first horizontal surface wherein the second container and a smoking material in the chamber, wherein the first container is vacuum packed and hermetically sealed.

16. The system of claim 15, wherein the first container comprises a gusset which can expand during a heating process.

17. The system of claim 15, wherein the first container comprises a modified atmosphere packaging.

18. The system of claim 17, wherein the modified atmosphere packaging comprises a gas selected from the group consisting of nitrogen gas, carbon dioxide gas, or a mixture thereof.

19. The system of claim 1, wherein the cover is configured so that any juices from the food product resulting from a heating process are retained by the cover.

20. The system of claim 1, wherein the first container is a bag made from a material selected from the group consisting of foil or a heat resistant film, and the second container is made from PET/Crystalline Polyethylene Terephthalate material.

* * * * *

UNITED STATES PATENT AND TRADEMARK OFFICE
CERTIFICATE OF CORRECTION

PATENT NO. : 9,936,713 B2
APPLICATION NO. : 14/653430
DATED : April 10, 2018
INVENTOR(S) : Philip L. Hancock Page 1 of 1

It is certified that error appears in the above-identified patent and that said Letters Patent is hereby corrected as shown below:

In the Claims

In Column 8, Line 5, in Claim 3, before "rectangular" delete "an" and insert --a--, therefor.

Signed and Sealed this
Second Day of October, 2018

Andrei Iancu
*Director of the United States Patent and Trademark Office*